(12) United States Patent
Onishi et al.

(10) Patent No.: US 6,714,323 B1
(45) Date of Patent: Mar. 30, 2004

(54) IMAGE READING APPARATUS AND LIGHT CONDUCTOR USED FOR THE SAME

(75) Inventors: Hiroaki Onishi, Kyoto (JP); Hisayoshi Fujimoto, Kyoto (JP); Norihiro Imamura, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 625 days.

(21) Appl. No.: 09/585,871

(22) Filed: Jun. 1, 2000

(30) Foreign Application Priority Data

Jun. 2, 1999  (JP) .......................................... 11-154765
Jun. 15, 1999 (JP) .......................................... 11-167766

(51) Int. Cl.$^7$ ................................................ H04N 1/04
(52) U.S. Cl. ...................... 358/475; 358/484; 358/491; 358/471; 250/208.1; 250/216; 250/227.2; 250/239
(58) Field of Search .............................. 250/208.1, 216, 250/227.2, 239; 358/475, 471, 484, 491; 347/2, 3

(56) References Cited

U.S. PATENT DOCUMENTS 3,976,877 A * 8/1976 Thillays ...................... 250/551
5,399,850 A * 3/1995 Nagatani et al. ......... 250/208.1

FOREIGN PATENT DOCUMENTS

JP          2-273257          4/1989

* cited by examiner

Primary Examiner—Edward Coles
Assistant Examiner—Heather D Gibbs
(74) Attorney, Agent, or Firm—Merchant & Gould P.C.

(57) ABSTRACT

An image reading apparatus includes a light source for illuminating an image reading region extending in the primary scanning direction, and a plurality of lenses for focusing light reflected on the image reading region and for producing reduced images. Each of the lenses has an optical axis which intersects a predetermined portion of the image reading region. The image reading apparatus further includes a plurality of light receiving elements for output of image signals based on the light focused by the lenses and a light conductor for leading the light emitted by the light source toward the image reading region. The light conductor leads the emitted light so that the predetermined portion of the image reading region is illuminated more brightly than the adjacent portions.

17 Claims, 14 Drawing Sheets

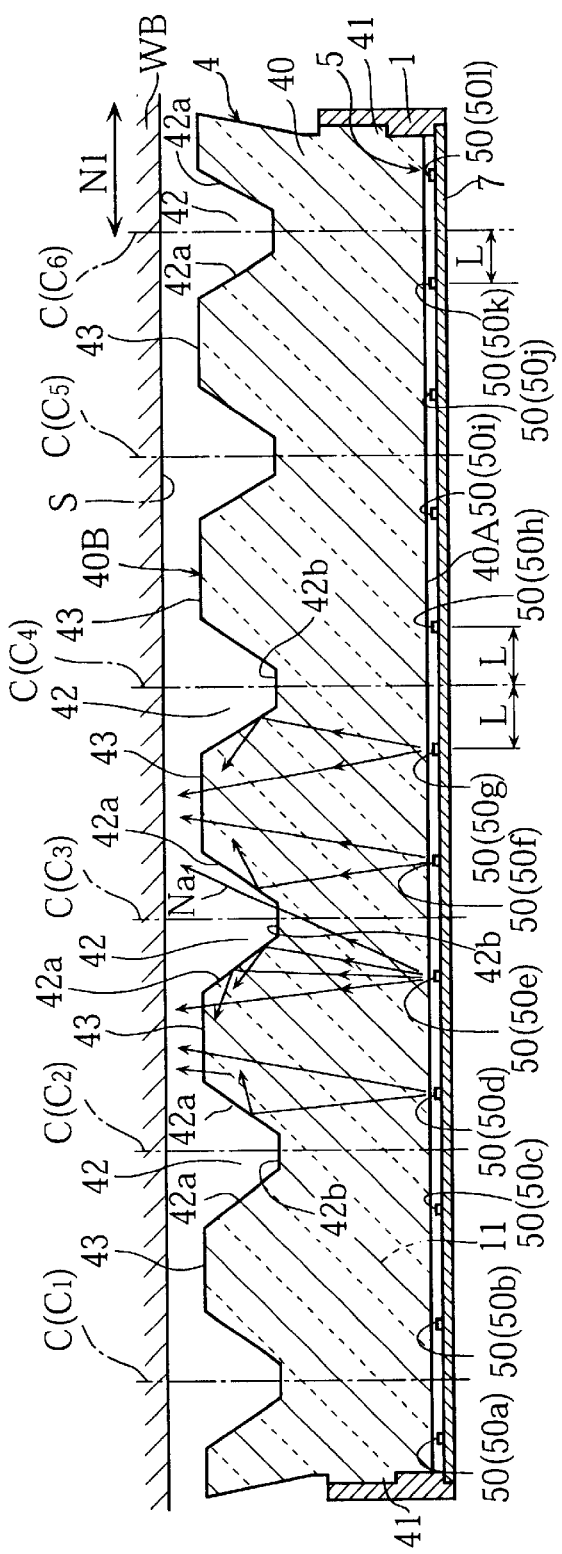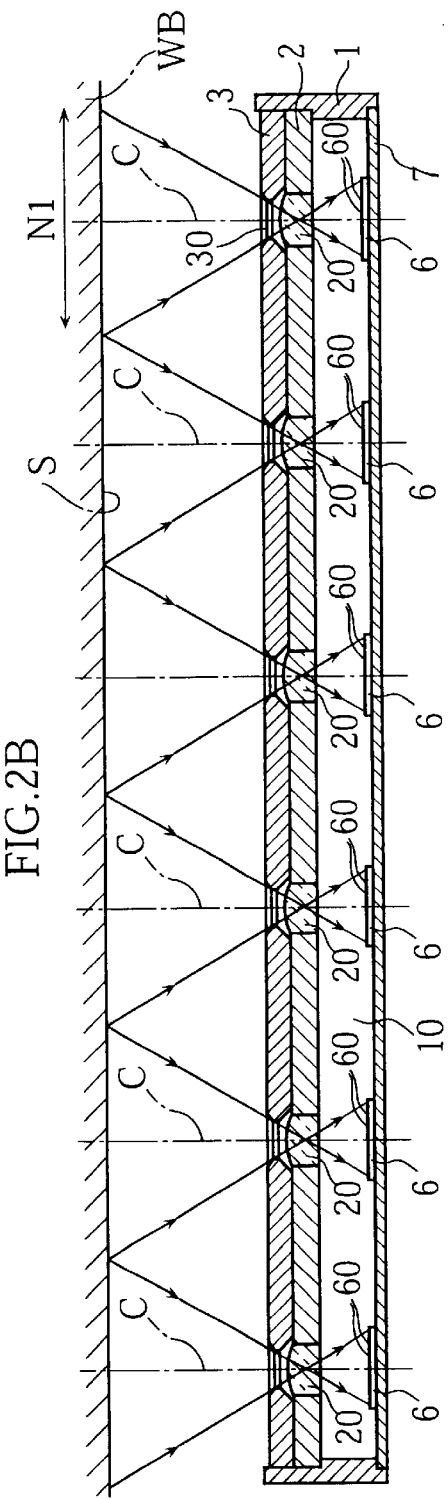

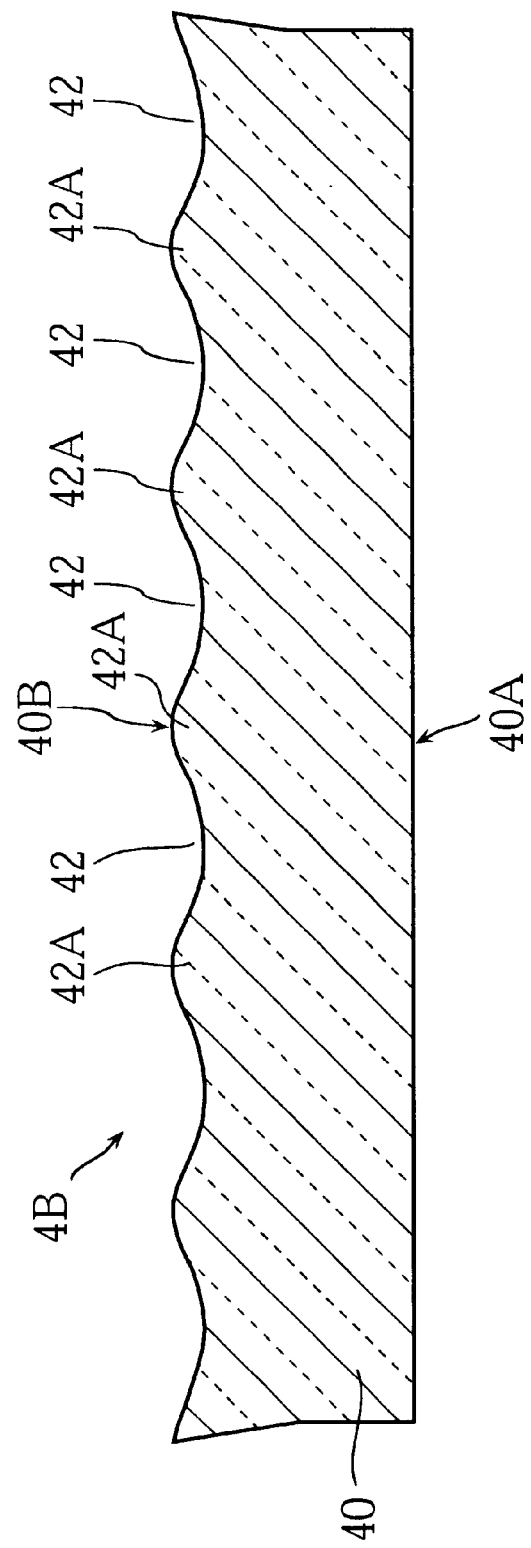

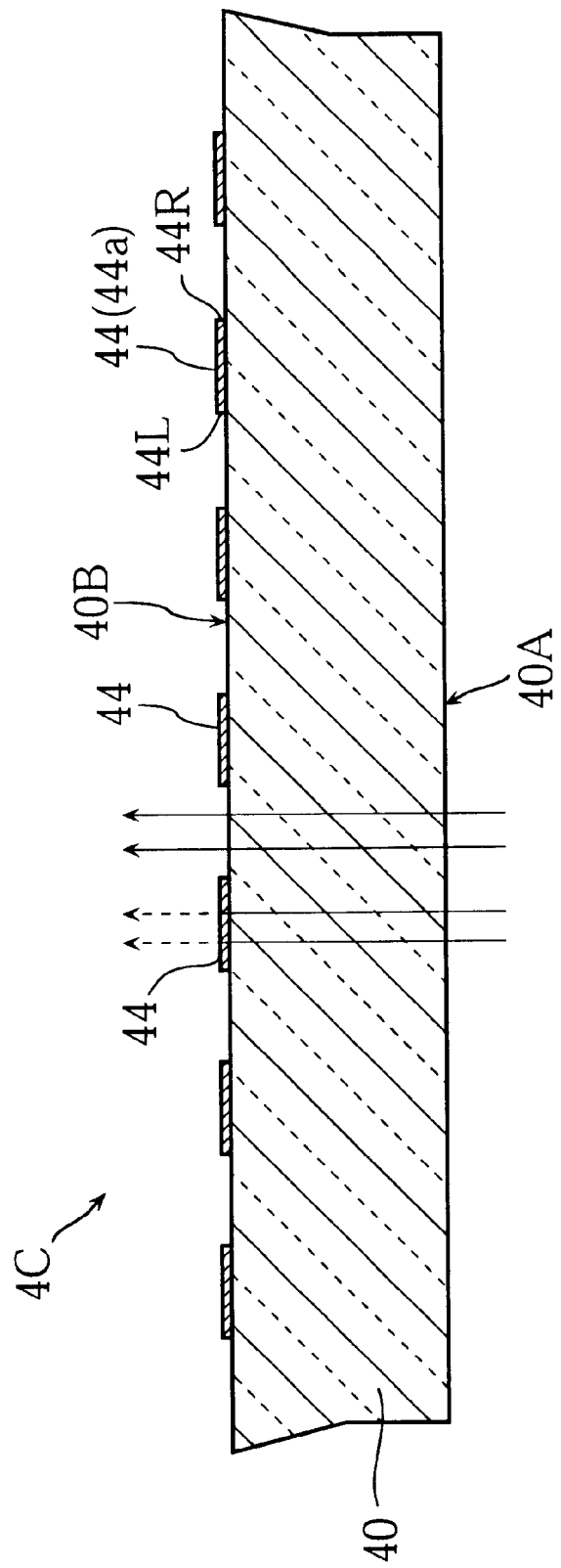

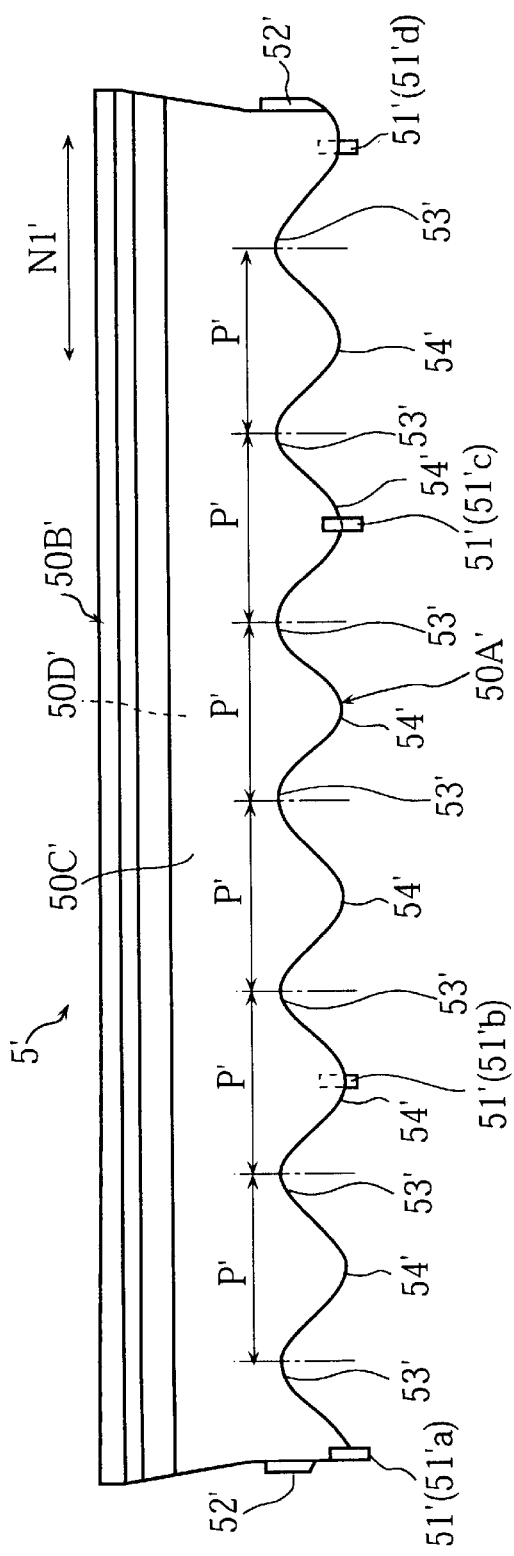
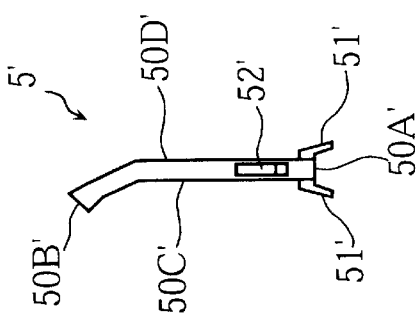
FIG.12A
FIG.12B

IMAGE READING APPARATUS AND LIGHT CONDUCTOR USED FOR THE SAME

BACKGROUND OF THE INVENTION

1. Field of the Invention

The present invention relates to an image reading apparatus. More particularly, it relates to an image reading apparatus used for making a reduced copy of figures, letters, etc drawn on a white board for example. The present invention also relates to a light conductor used for such an image reading apparatus.

2. Description of the Related Art

There are various kinds of image reading apparatuses used for reading images (figures, letters, etc) printed on a paper sheet or drawn on a white board. The optical system of such an image reading apparatus may include either selfoc (self-focusing) lenses or convex lenses for focusing the given original images onto the light receiving elements incorporated in the reading apparatus. The selfoc lenses, which are designed to perform a non-inverting and non-magnifying image-reading function, are preferably used for reading out the given images with high resolution. Generally, the selfoc lenses are more expensive than convex lenses. Thus, convex lenses are preferably used when high resolution is not required.

A conventional image reading apparatus disclosed in JP-A-2(1990)-273257 is shown in FIG. 15 of the accompanying drawings. The conventional apparatus includes a plurality of light receiving elements 91 mounted on a substrate 90, a plurality of convex lenses 92, and a light source (not shown) for illuminating the linear image reading region Sa. When the image reading region Sa is illuminated by the light source, the reflected light is converged by the convex lenses 92 to focus on the light receiving elements 91. The images received by the elements 91 are reduced-size, inverted images of the original (see an original arrow Oi and the focused arrow Ri). The light receiving elements 91 output image signals whose output levels correspond to the amounts of the received light.

Though conventional image reading apparatuses of the above type are widely used, they have been found disadvantageous in the following respect. As stated above, the conventional apparatus of FIG. 15 uses convex lenses 92 for its optical system. Thus, even if the image reading region Sa is uniformly illuminated by the light source, the image received by the light receiving elements 91 may be different in shade from the original, thereby failing to be the true image of the original. More specifically, referring to FIGS. 15 and 16, even if the original arrow Oi (see FIG. 15) is uniformly illuminated by the light source, the shade of the focused image Ri (see FIG. 16) may vary at positions. This is because light when passing through the convex lens 92 tends to be directed closer to the optical axis C of the lens 92. As a result, the central portion of D1 of the arrow Ri becomes brighter than its end portions D2, D3 (FIG. 16).

SUMMARY OF THE INVENTION

It is, therefore, an object of the present invention to provide an image reading apparatus which is capable of reproducing the true image of the original even if use is made of size-reducing lenses for the optical system.

Another object of the present invention is to provide a light conductor advantageously used in such an image reading apparatus.

According to a first aspect of the present invention, an image reading apparatus is provided. The apparatus comprises: a light source arranged to emit light for illuminating a linear image reading region extending in a primary scanning direction; a plurality of lenses arranged in an array for focusing light reflected on the image reading region and for producing reduced images, each of the lenses having an optical axis which intersects a predetermined portion of the image reading region; a plurality of light receiving elements for output of image signals based on the light focused by the lenses; and a light conductor for leading the light emitted by the light source toward the image reading region. The light conductor leads the emitted light so that said predetermined portion is illuminated more brightly than other portions of the image reading region which are adjacent to said predetermined portion.

According to a preferred embodiment, the light conductor includes a transparent member having a first surface and a second surface. The first surface faces the light source, while the second surface faces the image reading region. The transparent member is arranged to lead light from the first surface to the second surface so that distribution of light at the first surface is different from distribution of light at the second surface.

Preferably, the transparent member may be formed with a plurality of indents facing the image reading region. Each of the indents may be provided with an inclined portion slanted relative to the first surface of the transparent member.

According to a preferred embodiment, the transparent member may be formed with a plurality of projections facing the image reading region. Each of the projections may have a corner at which a cutout is provided.

The light source may include a plurality of light-emitting diodes arranged in an array. The light-emitting diodes may be offset in the primary scanning direction from the optical axes of the respective lenses.

Preferably, each of the light-emitting diodes may be held in facing relation to a relevant one of the inclined portions of the indents.

The image reading apparatus may further comprise a casing for supporting the light source, the lenses, the light receiving elements and the light conductor. The light conductor may protrude partially from the casing toward the image reading region.

According to a preferred embodiment, the first surface of the transparent member may be formed with a convex portion facing the light source.

According to another preferred embodiment, the light conductor may include a first transparent member and a second transparent member. Further, the light conductor may include more than two transparent members.

Preferably, the first transparent member may be provided with a light receiving surface facing the light source and a light emitting surface opposite to the light receiving surface. At least either one of the light receiving surface and the light emitting surface may be provided with a convex portion extending in the primary scanning direction.

According to a preferred embodiment, the second transparent member may be formed separately from the first transparent member. The second transparent member may be arranged to lead light emitted from the light emitting surface toward the image reading region.

Preferably, both the light receiving surface and the light emitting surface of the first transparent member may be convex.

Preferably, the second transparent member may be provided with a light receiving surface held in facing relation to the light emitting surface of the first transparent member.

According to a preferred embodiment, the light receiving surface of the second transparent member may be sinuous.

The image reading apparatus may further comprise light shielding members arranged between the light emitting surface of the first transparent member and the light receiving surface of the second transparent member.

Preferably, the first and the second transparent members may be fixed to each other. To this end, the first transparent member may be formed with a positioning groove, while the second transparent member may be formed with a leg portion fitted into the positioning groove of the first transparent member.

According to a second aspect of the present invention, there is provided a light conductor which comprises: a first surface for receiving light; a second surface for allowing the light to exit; and a plurality of indents defined by the second surface. Each indent is provided with an inclined portion slanted relative to the first surface.

According to a third aspect of the present invention, there is provided a light conductor which comprises: a first transparent member provided with a first light receiving surface and a first light emitting surface opposite the first light receiving surface, at least either one of the first light receiving surface and the first light emitting surface being formed with a convex portion; and a second transparent member formed separately from the first transparent member and provided with a second light receiving surface held in facing relation to the first light emitting surface of the first transparent member, the second transparent member being also provided with a second light emitting surface for allowing light to exit.

Other features and advantages of the present invention will become apparent from the detailed description given below with reference to the accompanying drawings.

BRIEF DESCRIPTION OF THE DRAWINGS

FIG. 2A is a sectional view taken along lines X1—X1 in FIG. 1;

FIG. 2B is a sectional view taken along lines X2—X2 in FIG. 1;

FIG. 6 is a sectional view showing a principal portion of another modified light conductor;

FIG. 7 is a sectional view showing a principal portion of still another modified light conductor;

FIG. 12A is a front view showing a second transparent member used for the image reading apparatus of the second embodiment;

FIG. 12B is a side view showing the second transparent member of FIG. 12A;

DETAILED DESCRIPTION OF THE PREFERRED EMBODIMENTS

The preferred embodiments of the present invention will be described below with reference to the accompanying drawings.

Reference is first made to FIGS. 1–4 illustrating an image reading apparatus Ra according to a first embodiment of the present invention. The image reading apparatus Ra is described as applicable for reading out images (figures, letters, etc) written on a white board WB, though the present invention is not limited to this example.

Figure 1:
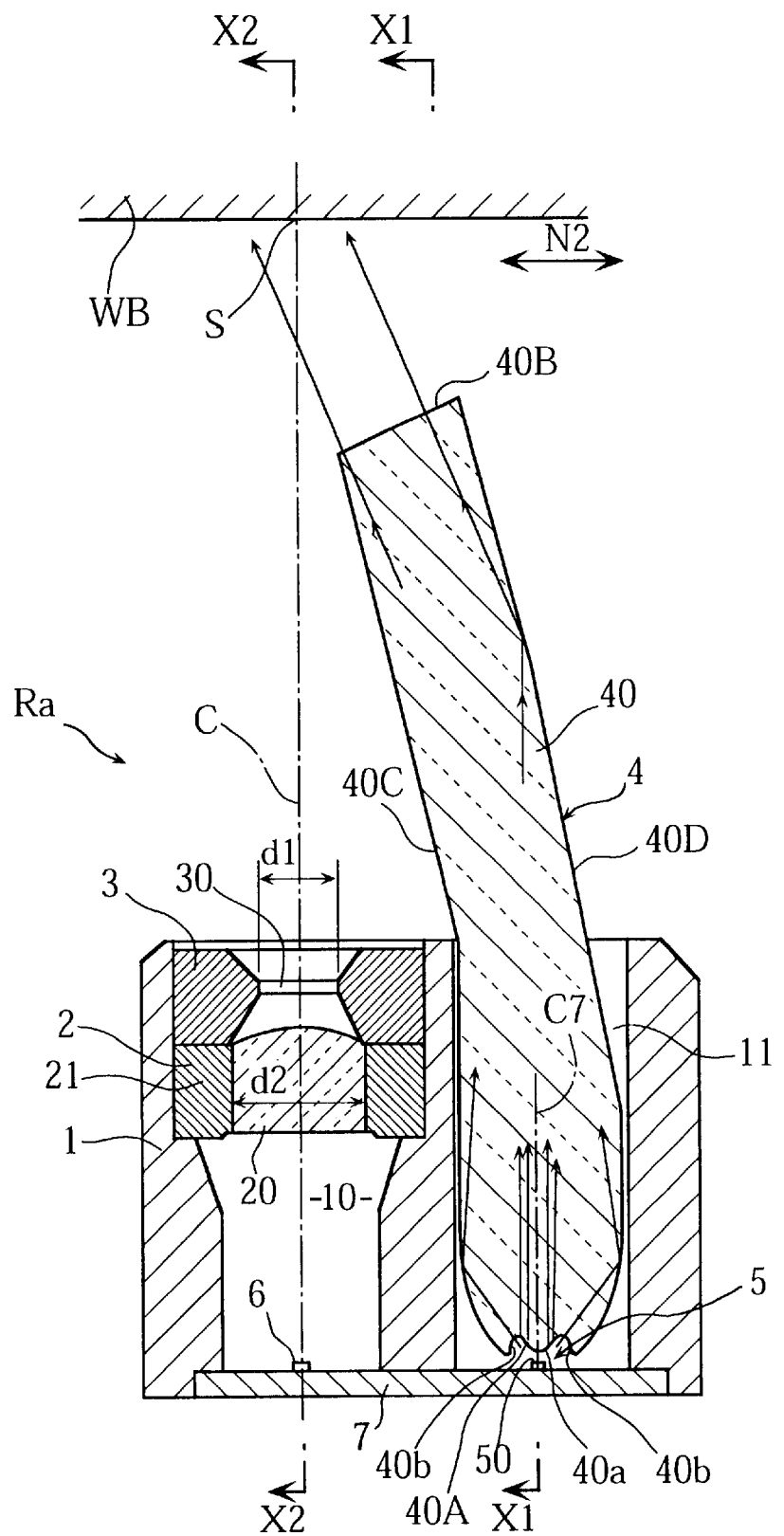
FIG. 1 is a sectional view showing the principal parts of an image reading apparatus according to a first embodiment of the present invention.

In FIG. 1, the white board WB is depicted as extending horizontally, and the image reading apparatus Ra is disposed below it. This composition is adopted merely for convenience of illustration. Actually, the white board WB is held in an upright position, so that the writing surface of the board WB is readily accessed.

As seen from FIG. 1 or 2B, the image reading apparatus Ra includes a casing 1, a convex lens array 2, a lens array cover 3, a light conductor 4, a light source 5, a plurality of light detectors 6 and an insulating substrate 7. As will be described in detail hereinbelow, the light conductor 4 serves to adjust or alter the distribution of light emitted from the light source 5. As shown in FIG. 2B, each light detector 6 is provided with a predetermined number of light receiving elements 60.

The casing 1, which may be made of a synthetic resin material, has an elongated configuration, as seen from FIGS. 2A and 2B. The casing 1 is provided with first and second hollow portions 10 and 11 both of which are open upward and downward (as viewed in FIG. 1). The first and the second hollow portions 10, 11 are elongated longitudinally of the casing 1. As will be described below, components required for the reading apparatus Ra are accommodated in either the first hollow portion 10 or the second hollow portion 11. The casing 1 is carried by a movable supporting member (not shown) in facing relation to the white board WB. The casing 1 is caused to move in a secondary scanning direction N2 (FIG. 1) by the non-illustrated supporting member. The distance between the casing 1 and the white board WB is kept constant as the casing 1 is moved in the secondary scanning direction N2.

As shown in FIG. 2B, the lens array 2 includes a plurality of convex lenses 20 held together by a holder 21 made of e.g.

a synthetic resin material. As shown in FIGS. 1 and 2B, the lens array 2 is fitted into the first hollow portion 10 and positioned at a suitable height in the first hollow portion 10. The convex lenses 20 are arranged at regular intervals in a primary scanning direction N1 (FIG. 2A) perpendicular to the secondary scanning direction N2 (FIG. 1).

In the illustrated embodiment, the holder 21 is prepared separately from the respective convex lenses 20.

Alternatively, the holder 21 and the convex lenses 20 may be integrally made of a synthetic resin material. A linear image reading region S on the white board WB extends in the primary scanning direction N1 (see FIG. 2B). As shown in FIG. 1, the image reading region S is intersected by the optical axes C of the respective convex lenses 20.

As shown in FIG. 1, the lens array cover 3, which may be made of a dark-colored (e.g. black) synthetic resin material, is fitted into the first hollow portion 10 to come into direct contact with the upper portion of the lens array 2. The lens array cover 3 ensures proper positioning of the lens array 2. The lens array cover 3 is formed with a plurality of through-holes 30 corresponding in number and position to the convex lenses 20, as seen from FIG. 2B. Each through-hole 30 serves as a light-restricting aperture for adjusting the amount of light incident on a relevant one of the convex lenses 20. The center of each through-hole 30 coincides with the optical axis C of the relevant convex lens 20.

In the illustrated embodiment, as seen from FIG. 1, the inner diameter d1 of each through-hole 30 is smaller than the diameter d2 of the relevant convex lens 20. In this manner, light is prevented from entering each convex lens 20 at its radially outer portion (i.e., peripheral portion). Thus, the focusing of light is performed only by the central portion of each convex lens 20, which is advantageous for generating a clearly focused image. If the diameter $d_1$ of each through-hole 30 is much greater, the focused image will be brighter. Unfavorably, however, the distinctness or sharpness of the image may be compromised.

The light detectors 6 are mounted on the obverse surface of the substrate 7. As shown in FIG. 2B, the light detectors 6 are arranged at regular intervals in the primary scanning direction N1. Thus, the light receiving elements 60 of the respective light detectors 6 are arranged in a row extending in the primary scanning direction N1. The light receiving elements 60 convert received light into an electric signal based on the amount of the received light. The substrate 7 is attached to the bottom portion of the casing 1 to close the downward openings of the first and the second hollow portions 10, 11. As shown in FIGS. 1 and 2B, each light detector 6 is held in facing relation to a relevant one of the convex lenses 20 when the substrate 7 is fixed to the casing 1. With such an arrangement, images illuminated at the image reading region S are focused onto the light detectors 6 through the convex lenses 20, as shown in FIG. 2B.

Referring to FIGS. 1 and 2A, the light source 5 includes a plurality of light emitting devices 50 such as light-emitting diodes (LEDs). The light emitting devices 50, which are mounted on the obverse surface of the substrate 7, are received in the second hollow portion 11 when the substrate 7 is attached to the casing 1. As shown in FIG. 2A, the light emitting devices 50 are spaced from each other in the primary scanning direction N1. As illustrated, two light emitting devices are arranged adjacent to a corresponding one of the optical axes C of the respective convex lenses 20.

Specifically, the light emitting devices 50a, 50b (which come first and second from the left in FIG. 2A) are arranged close to the first optical axis $C_1$, the next two light emitting devices 50c, 50d close to the second optical axis $C_2$, and so on. The first paired light emitting devices 50a, 50b are arranged symmetrically with respect to the first optical axis $C_1$, the second paired light emitting devices 50c, 50d with respect to the second optical axis $C_2$, and so on. In the illustrated embodiment, any paired light emitting devices 50 are spaced from the relevant one of the optical axes C by a predetermined distance L (see the fourth optical axis $C_4$ and the paired light emitting devices 50g, 50h).

Preferably, each light emitting device 50 may include a combination of two LEDs of different colors. One of these two LEDs may be designed to emit green light, while the other may be designed to emit red light. With such an arrangement, when only the red LEDs are turned on to emit red light, red portions of the images at the image reading region S are not read out by the light detectors 6. On the other hand, when the green LEDs are turned on, all the images at the image reading region S may be read out by the light detectors 6. Thus, by comparing the read-out images obtained at one time (when only the red LEDs are turned on) with the other read-out images obtained at another time (when only the green LEDs are turned on), it is possible to distinguish the red portions from the other portions of the images at the image reading region S. In this manner, a two-color image-reading function can be performed. This function is particularly advantageous in making a copy of images written on the white board WB since these images are often written in black or red. It should be noted, however, that the present invention is not limited to this example. For instance, the light source may be designed to emit white light or light of a single color such as green.

According to the present invention, a single, linear cold cathode tube may be used for the light source 5 in place of the light emitting devices 50.

The light conductor 4 includes a transparent member 40. Preferably, the transparent member 40 may be made of a material having high transparency and high mechanical strength. The examples of such a material may be poly (methyl methacrylate) (PMMA) or polycarbonate (PC). In the illustrated embodiment, the light conductor 4 is constituted by a single transparent member. However, as will be described later, the light conductor 4 may be made up of more than one transparent member.

Figure 3C:
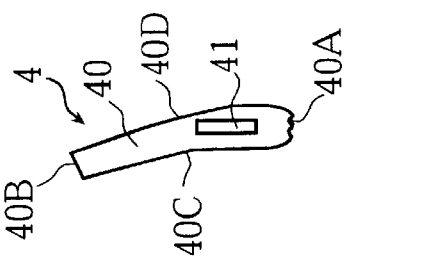
FIG. 3C is a side view showing the same light conductor.
Figure 3A:
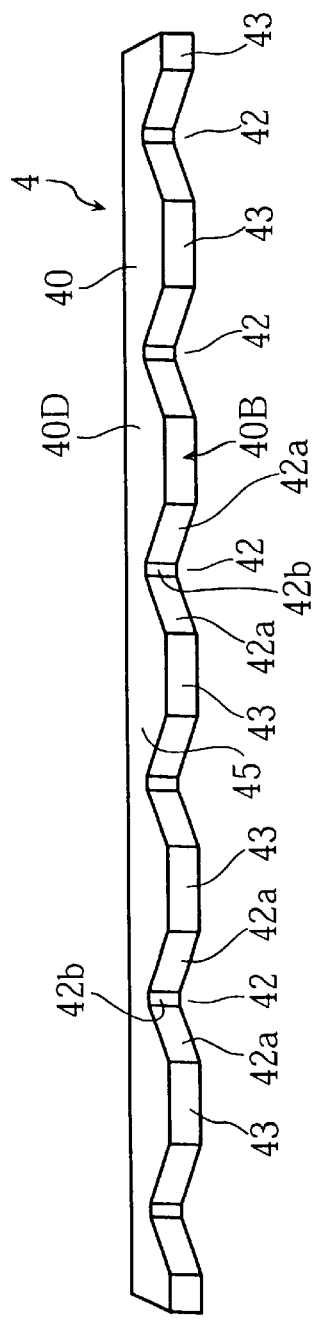
FIG. 3A is a plan view showing a light conductor used for the image reading apparatus of FIG. 1.
Figure 3B:
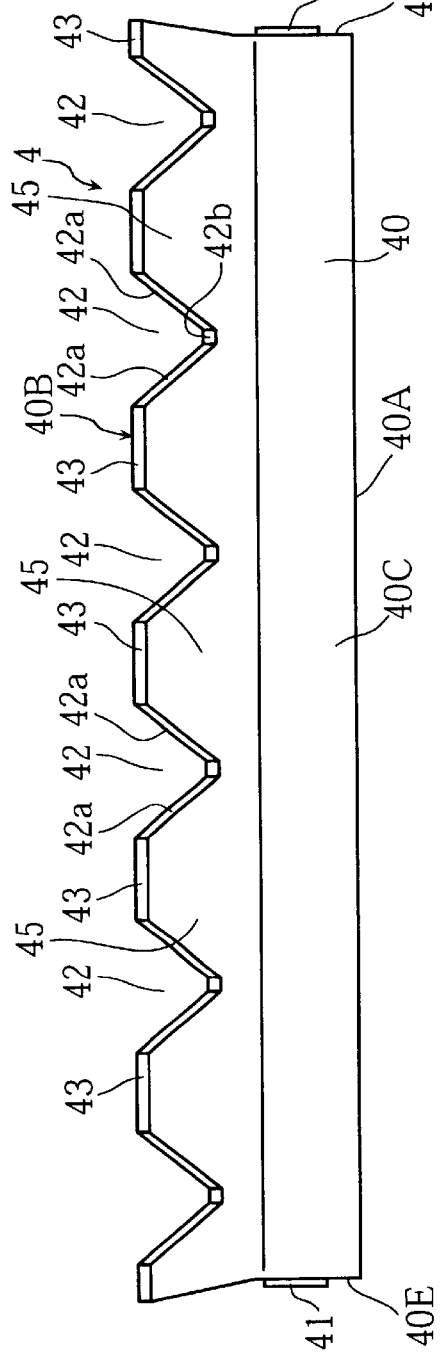
FIG. 3B is a front view showing the light conductor of FIG. 3A.

As shown in FIGS. 3A and 3B, the transparent member 40 has an elongated, generally plate-like configuration. Referring also to FIG. 3C, the transparent member 40 is provided with a first side surface 40A, a second side surface 40B, a third side surface 40C and a fourth side surface 40D. The first side surface 40A is opposite to the second side surface 40B, while the third side surface 40C is opposite to the fourth side surface 40D. As best shown in FIG. 3B, the transparent member 40 has two ends 40E which are spaced from each other in the longitudinal direction of the transparent member 40. Each end 40E is formed with a protrusion 41 for properly positioning the transparent member 40 relative to the casing 1 (see FIG. 2A). In place of the protrusions 41, the transparent member 40' may be formed with two retreated portions at the respective ends 40E.

Preferably, each of the above-mentioned side surfaces 40A–40D may be a smooth surface. Advantageously, each side surface may be an extremely smooth surface or mirror surface. When the first to the fourth side surfaces 40A–40D are sufficiently smooth, light propagating through the transparent member 40 can be totally internally reflected on these surfaces when it meets them at an incidence angle greater than the critical angle. As is known, the critical angle depends on the material making the transparent member 40. When light propagating through the transparent member 40 meets the side surfaces 40A–40D at an incidence angle smaller than the critical angle, it goes out of the transparent member 40 through these side surfaces.

As shown in FIGS. 1 and 2, the first side surface 40A is held in facing relation to the light emitting devices 50. Thus, when the light emitting devices 50 are turned on, light emitted from them enters the transparent member 40 at the first side surface 40A.

Figure 4:
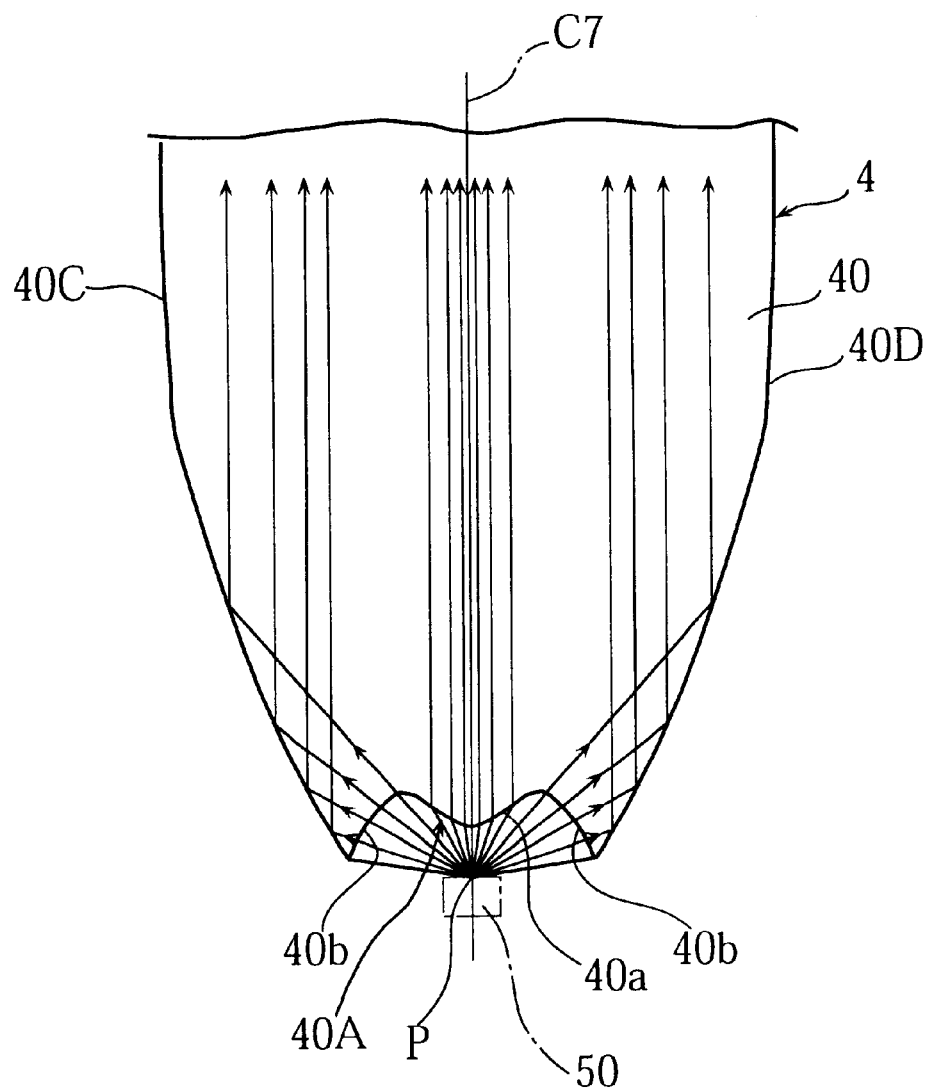
FIG. 4 is an enlarged view showing a principal portion of the same light conductor.

Referring to FIG. 4, the first side surface 40A of the transparent member 40 is provided with a central convex portion 40a and two concaved portions 40b flanking the convex portion 40a. The convex portion 40a and the concaved portions 40b extend longitudinally of the transparent member 40 and have an unvarying cross section over the entire length of the first side surface 40A. As illustrated, the cross section of the convex portion 40a is so configured as to cause the radially emitted light beams from the light emitting devices 50 to travel generally in parallel to the optical axis $C_7$ of the convex portion 40a. Preferably, the concaved portions 40b may have a generally arcing contour whose center of curvature coincides with the position P from which light of the light emitting devices 50 originates. With such an arrangement, the incidence angle of light meeting these concaved portions 40b can be substantially zero. Thus, the total reflection of the light upon meeting the concaved portions 40b does not occur, whereby the light will efficiently propagate into the transparent member 40.

Referring back to FIGS. 3A–3C, the second side surface 40B serves as a light emitting surface from which the light propagating through the transparent member 40 is let out. As best shown in FIG. 3B, the second side surface 40B is provided with a plurality of generally V-shaped indents 42 arranged at regular intervals in the longitudinal direction of the transparent member 40. Each V-shaped indent 42 is defined by a pair of inclined portions 42a and a bottom portion 42b of the second side surface 40B. The lower ends of the respective inclined portions 42a are connected to each other by the bottom portion 42b. The distance between the lower ends of the respective inclined portions 42a is smaller than the distance between the upper ends of the same inclined portions 42a. In addition to the inclined portions 42a and the bottom portions 42b, the second side surface 40B is formed with level portions 43 extending generally in parallel to the first side surface 40A. These level portions 43 together with the inclined portions 42a define a plurality of truncated projections 45.

The third side surface 40C and the fourth side surface 40D are arranged to totally reflect the light propagating through the transparent member 40 for enabling the light to be efficiently led from the first side surface 40A to the second side surface 40B. As shown in FIG. 3C, the transparent member 40 as a whole is not upright but bent. Thus, as shown in FIG. 1, the first side surface 40A of the transparent member 40 is held in facing relation to the light emitting devices 50 (arranged away from the optical axes C), while the second side surface 40B is directed to the image reading region S (intersecting the optical axes C).

As shown in FIG. 1, the lower portion of the light conductor 4 (i.e., the portion containing the first side surface 40A) is received in the second hollow portion 11 of the casing 1 in a manner such that the first side surface 40A extends in the primary scanning direction. On the other hand, the upper portion of the light conductor 4 (i.e., the remaining portion containing the second side surface 40B) protrudes from the casing 1 toward the image reading region S.

As shown in FIG. 2A, the light conductor 4 is fixed to the casing 1 in a manner such that the center of the bottom portion 42b of each V-shaped indent 42 intersects a corresponding one of the optical axes C. Thus, each V-shaped indent 42 is halved by the relevant optical axis C. As illustrated, each of the light emitting devices 50 is positioned below a corresponding one of the inclined portions 42a of the transparent member 40.

The function of the image reading apparatus Ra having the above-described arrangements will now be described.

Referring to FIG. 1, when the light emitting devices 50 are turned on, the light emitted from them enters the transparent member 40 through the first side surface 40A. Then, the light will propagate through the transparent member 40 to reach the second side surface 40B. During the travel from the first side surface 40A to the second side surface 40B, the propagating light may strike the third side surface 40C and/or the fourth side surface 40D to be totally reflected, or it may directly reach the second side surface 40B from the first side surface 40A without meeting the third or fourth side surface.

As stated above, light beams passing through the convex portion 40a of the first side surface 40A are directed in the same direction, so that they will propagate in parallel to the optical axis $C_7$. Advantageously, the parallel light beams are effectively led to the second side surface 40B. Further, as shown in FIG. 1, the convex portion 40a is arranged above the light emitting devices 50. Thus, most of the light emitted from the light emitting devices 50 will strike the convex portion 40a, and therefore be efficiently led to the second side surface 40B. Even if the emitted light misses the convex portion 40A, it may meet either one of the two concaved portions 40b arranged adjacent to the convex portion 40a. Thus, the light emitted from the light emitting devices 50 is properly led through the transparent member 40 from the first side surface 40A to the second side surface 40B, thereby minimizing loss of light.

As shown in FIG. 2A, when light strikes the inclined portions 42a of the second side surface 40B, it may be totally inwardly reflected by them. The critical angle for total inward reflection may be 45 degrees for example. The possibility of such total inward reflection is greater especially when light emitted from one of the light emitting devices 50 directly reaches the inclined portion 42a which is located right above the particular one of the light emitting devices (for example, see the fifth light emitting device 50e and the light emitted therefrom). The technical advantage obtained from this arrangement is as follows.

If use is not made of the light conductor 4, the light emitting devices 50 illuminate more brightly the particular portions of the region S located right above the respective light emitting devices 50 than the other portions of the region S. In the image reading apparatus Ra, on the other hand, the propagating light tends to be totally inwardly reflected on the inclined portions 42a of the second side surface 40B. Thus, the illumination pattern at the image reading region S with the light conductor 4 provided is different (i.e., altered) from the illumination pattern with no light conductor provided.

As shown in FIG. 2A, when the light propagating through the transparent member 40 meets the bottom portions 42b of the second side surface 40B, it may pass through them without being reflected (see an arrow Na extending from the fifth light emitting device 50e). As viewed in the primary scanning direction N1, the bottom portions 42b overlap the optical axes C of the convex lenses 20. On the other hand, the light emitting devices 50 are offset from the optical axes C by the distance L. Thus, as shown by the above-mentioned arrow Na, the light emitted from a light emitting device 50 will travel away from the optical axis C after passing through the bottom portion 42b. This means that the light exiting the transparent member 40 via the bottom portions 42b may not illuminate the portions of the image reading region S which intersect the optical axes C.

In the image reading apparatus Ra, as seen from the above, the optical axis-intersecting portions of the image reading region S are illuminated less brightly than when no light conductor is provided. In the illustrated embodiment, each bottom portion 42b is rendered flat, so that light is allowed to pass through without being reflected. Alternatively, the bottom portion 42b may be curved so as to cause light to be totally inwardly reflected more frequently.

When the light propagating through the transparent member 40 meets the level portions 43 of the second side surface 40B, the light tends to pass through them since the incidence angle is often smaller than the critical angle for total inward reflection. As shown in FIG. 2A, each level portion 43 is located between the two adjacent optical axes C to be spaced therefrom. Thus, the light exiting the transparent member 40 via the level portion 43 illuminates only a limited portion of the image reading region S which is located between the two adjacent optical axes C.

Since the light conductor 4 is designed as described above, it is possible to illuminate more brightly the portions of the image reading region S which are spaced away from the optical axes C than the remaining portions which are closer to the optical axes C. According to the present invention, the design of the illustrated light conductor 4 may be modified so that the illumination at the image reading region S will have a different pattern. For instance, the inclination and length of the respective inclined portions 42a may be made greater or smaller. By adjusting the configuration of the light conductor 4, it it possible to realize a desired illumination pattern at the image reading region S. For instance, it is possible to gradually change the brightness of the illumination pattern in accordance with the distance from the optical axes C.

Referring now to FIG. 2B, when the image reading region S is illuminated, the reflected light is focused onto the light detectors 6 by the convex lenses 20. The focused image is inverted and reduced in size as compared to the original image. Based on the received light, the light receiving elements 60 of the light detectors 6 will output image signals. Each of the illustrated lenses 20 is an ordinary convex lens. Thus, when an original image is illustrated with uniform brightness, the resulting image focused by the convex lens 20 will be brighter in a portion adjacent to the optical axis of the lens than in the other portions. However, in the image reading apparatus Ra of the present invention, the optical axis-intersecting portions of the image reading region S are illuminated less brightly than the other portions. Since the effect of this nonuniform illumination is cancelled out by the above-described light-focusing behavior of the convex lenses 20, the image focused onto the light detectors 6 reflects the true shades of the original image.

Figure 5A:
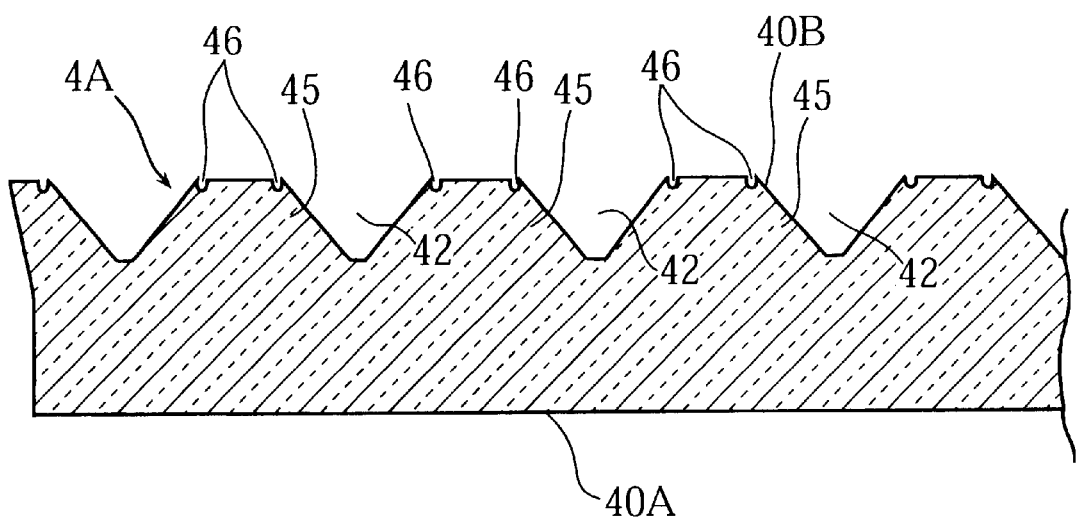
FIG. 5A is a sectional view showing a principal portion of a modified light conductor.
Figure 5B:
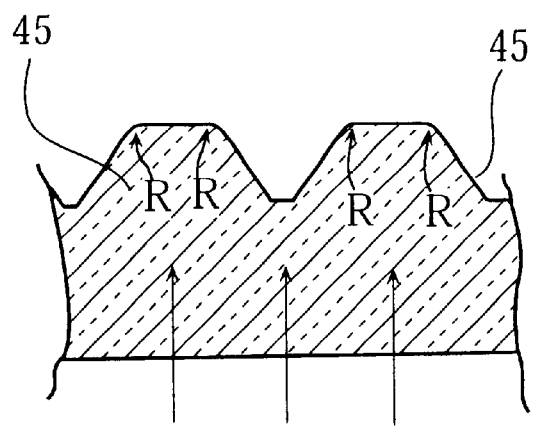
FIG. 5B is a sectional view showing a principal portion of a light conductor compared to the modified light conductor of FIG. 5A.

FIG. 5A shows a modified light conductor 4A usable for the image reading apparatus Ra. The light conductor 4A is provided with V-shaped concaved portions 42 and truncated projections 45 similar to those of the light conductor 4 (see FIG. 2A). Each truncated projection 45 of the modified conductor 4A, however, is formed with two cutouts 46 disposed at its corners. Such an arrangement is advantageous in preventing concentration of light emission which might otherwise occur at the corners. Specifically, if such cutouts are not provided and the respective truncated projections 45 have two round corners R, as shown in FIG. 5B, light tends to be concentrated at these round corners R. As a result, an unduly large amount of light may be emitted from the round corners R toward the image reading region. This problem may be readily overcome or at least reduced by forming cutouts 46 at the corners of each truncated projection 45.

FIG. 6 shows another modified light conductor 4B. The transparent member 40 has a sinuous second side surface 40B. As illustrated, the second side surface 40B defines a plurality of convex portions 42A and shallow concaved portions 42 arranged alternately with the convex portions 42A. It is clear that the light conductor 4B functions in the same manner as the light conductor 4 of FIG. 2A.

FIG. 7 shows another modified light conductor 4C. The transparent member 40 of the light conductor 4C is provided with a flat first surface 40A and a flat second surface 40B extending in parallel to the first surface 40A. As illustrated, a plurality of light shielding pieces 44 are fixed to the second surface 40B. These shielding pieces 44 are arranged at regular intervals in a row extending longitudinally of the transparent member 40. Each light shielding piece 44 is opaque or less transparent than the transparent member 40. Each light shielding piece 44 may have uniform transparency (or opaqueness). Alternatively, the transparency of each light shielding piece 44 may be varied in accordance with positions. For instance, the opaqueness of the illustrated light shielding piece 44a may be gradually increased from the left side 44L to the right side 44R.

Reference is now made to FIGS. 8–12B illustrating an image reading apparatus Rb according to a second embodiment of the present invention.

Figure 8:
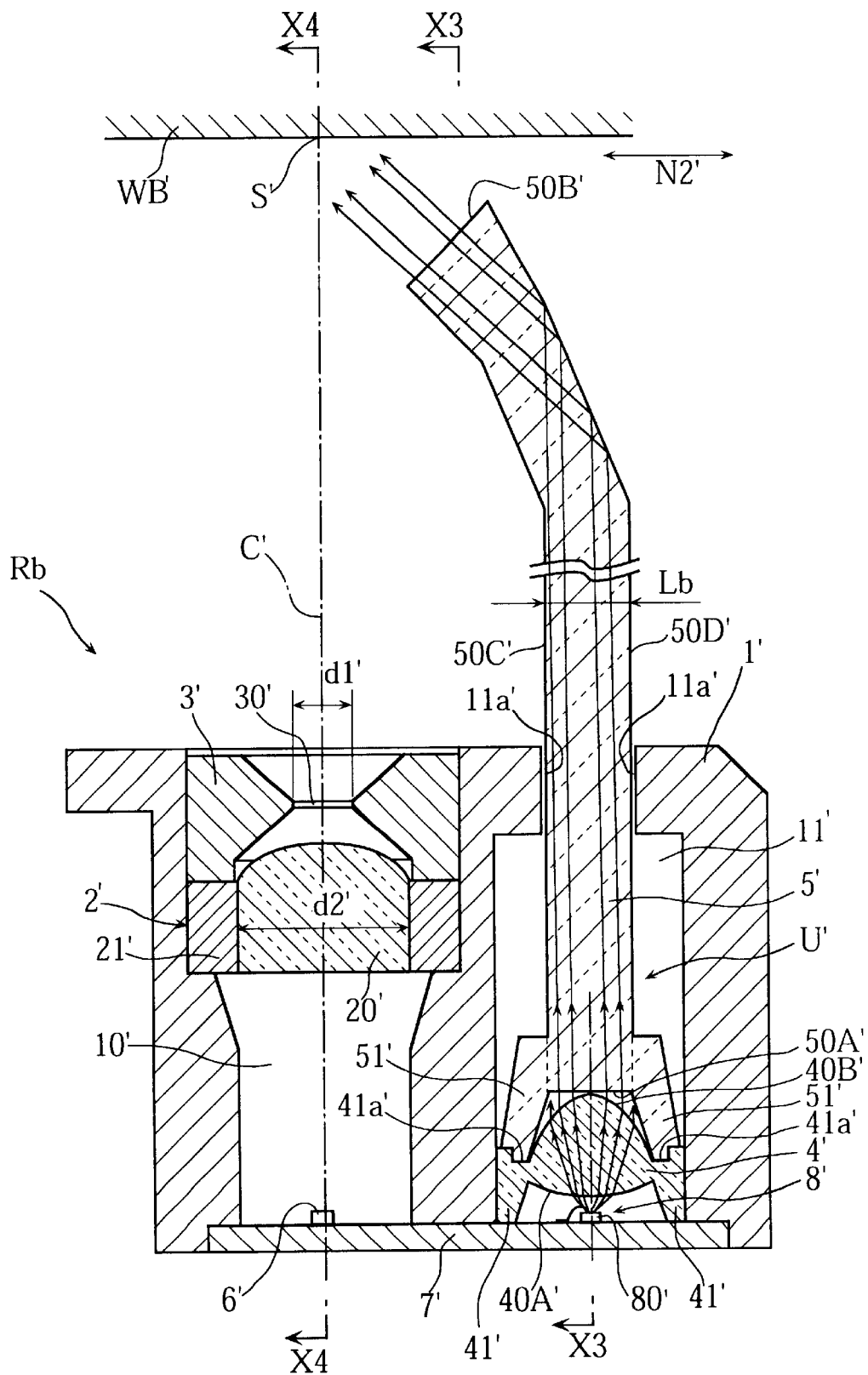
FIG. 8 is a sectional view showing an image reading apparatus Rb according to a second embodiment of the present invention.

As shown in FIG. 8, the image reading apparatus Rb includes a casing 1', a lens array 2', a lens array cover 3', a light conducting unit U', a light source 8', a plurality of light detectors 6', and an insulating substrate 7'. The light conducting unit U' is made up of a first transparent member 4' and a second transparent member 5'.

The casing 1', which may be made of a synthetic resin material, has an elongated configuration. The casing 1' is provided with first and second hollow portions 10' and 11' both of which are open upward and downward. The first and the second hollow portions 10', 11' are elongated longitudinally of the casing 1'. As will be described below, components required for the reading apparatus Rb are accommodated in either the first hollow portion 10' or the second hollow is portion 11'. The casing 1' is carried by a movable supporting member (not shown) in facing relation to the white board WB'. The casing 1' is caused to move in a secondary scanning direction N2' by the non-illustrated supporting member. While being moved in the direction N2', the distance between the casing 1' and the white board WB' is kept constant.

The lens array 2' includes a plurality of convex lenses 20' held together by a holder 21' made of e.g. a synthetic resin material. The lens array 2' is fitted into the first hollow portion 10' and positioned at a predetermined height in the first hollow portion 10'. The convex lenses 20' are arranged at regular intervals in a primary scanning direction N1' (FIG. 10) perpendicular to the secondary scanning direction N2' (FIG. 8). In the illustrated embodiment, the holder 21' is prepared separately from the respective convex lenses 20'. Alternatively, the holder 21' and the convex lenses 20' may be integrally made of a synthetic resin material. A linear image reading region S' on the white board WB' extends in the primary scanning direction N1' and intersects the optical axes C' of the respective convex lenses 20' (FIG. 8).

As shown in FIG. 8, the lens array cover 3', which may be made of a dark-colored (e.g. black) synthetic resin material, is fitted into the first hollow portion 10' to come into direct contact with the upper portion of the lens array 2'. The lens array cover 3' ensures proper positioning of the lens array 2'. The lens array cover 3' is formed with a plurality of through-holes 30' corresponding in number and position to the convex lenses 20', as seen from FIG. 10. Each through-hole 30' serves as a light-restricting aperture for adjusting the amount of light incident on a relevant one of the convex lenses 20'. The center of each through-hole 30' coincides with the optical axis C' of the relevant convex lens 20'.

As shown in FIG. 8, the inner diameter $d_1'$ of each through-hole 30' is smaller than the diameter $d_2'$ of the relevant convex lens 20'. In this manner, light is prevented from entering each convex lens 20' at its radially outer portion (i.e., peripheral portion). Thus, the focusing of light is performed only by the central portion of each convex lens 20', which is advantageous for generating a clearly focused image through the lens 20'.

Figure 10:
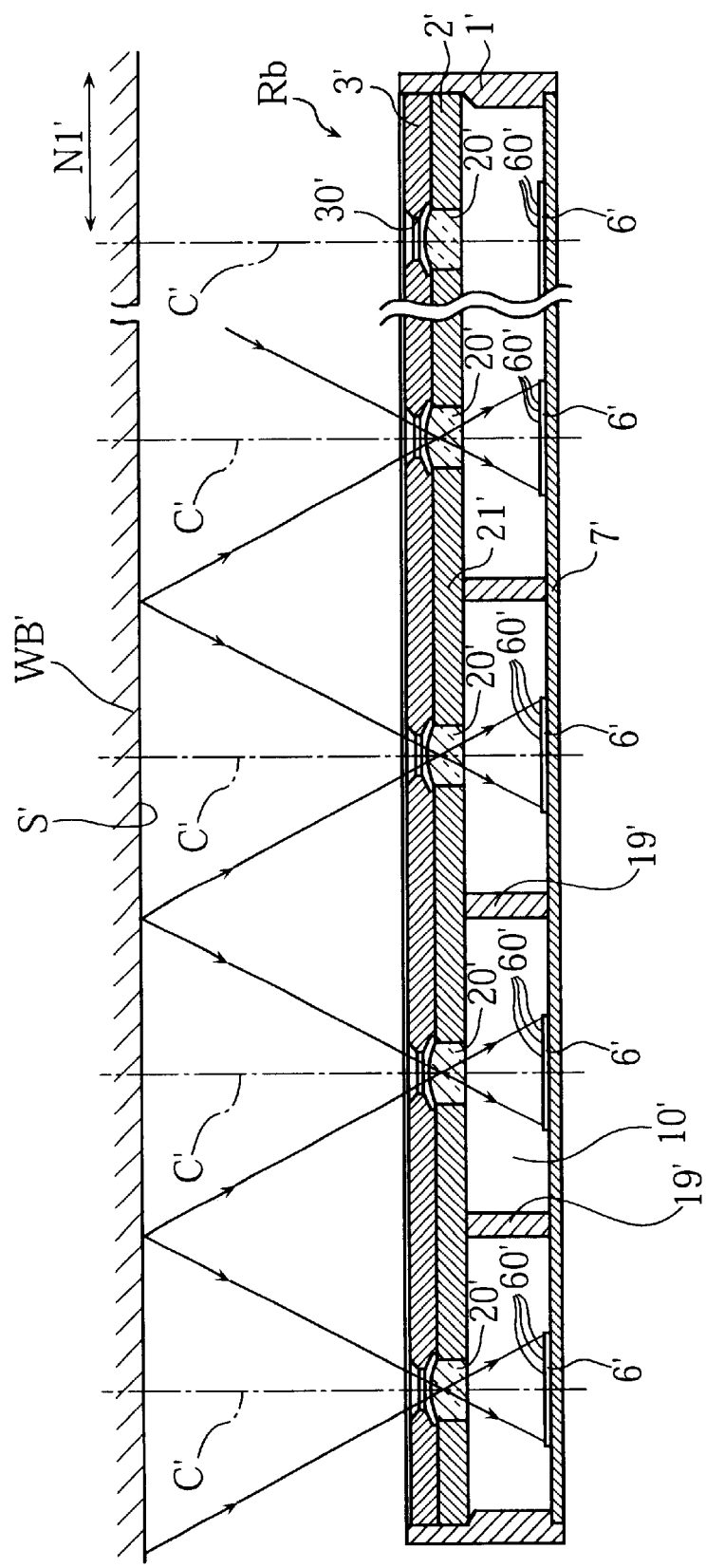
FIG. 10 is a sectional view taken along lines X4—X4 in FIG. 8.

The light detectors 6' are mounted on the obverse surface of the substrate 7'. As shown in FIG. 10, the light detectors 6' are arranged at regular intervals in the primary scanning direction N1'. As a result, the light receiving elements 60' of the respective light detectors 6' are arranged in a row extending in the primary scanning direction N1'. The light receiving elements 60' convert received light into an electric signal based on the amount of the received light. The substrate 7' is attached to the bottom portion of the casing 1' to close the downward openings of the first and the second hollow portions 10', 11'. As shown in FIGS. 8 and 10, each light detector 6' is held in facing relation to a relevant one of the convex lenses 20' when the substrate 7' is fixed to the casing 1'. With such an arrangement, images illuminated at the image reading region S' are focused onto the light detectors 6' through the convex lenses 20', as shown in FIG. 10. According to the second embodiment, the casing 1' is provided with a plurality of partitions 19' to divide the first hollow portion 10' into subdivisions. Each subdivision contains one convex lens 20' and one light detector 6'. The subdivisions are separated from each other by the partitions 19' so that interference of light is prevented.

Figure 9:
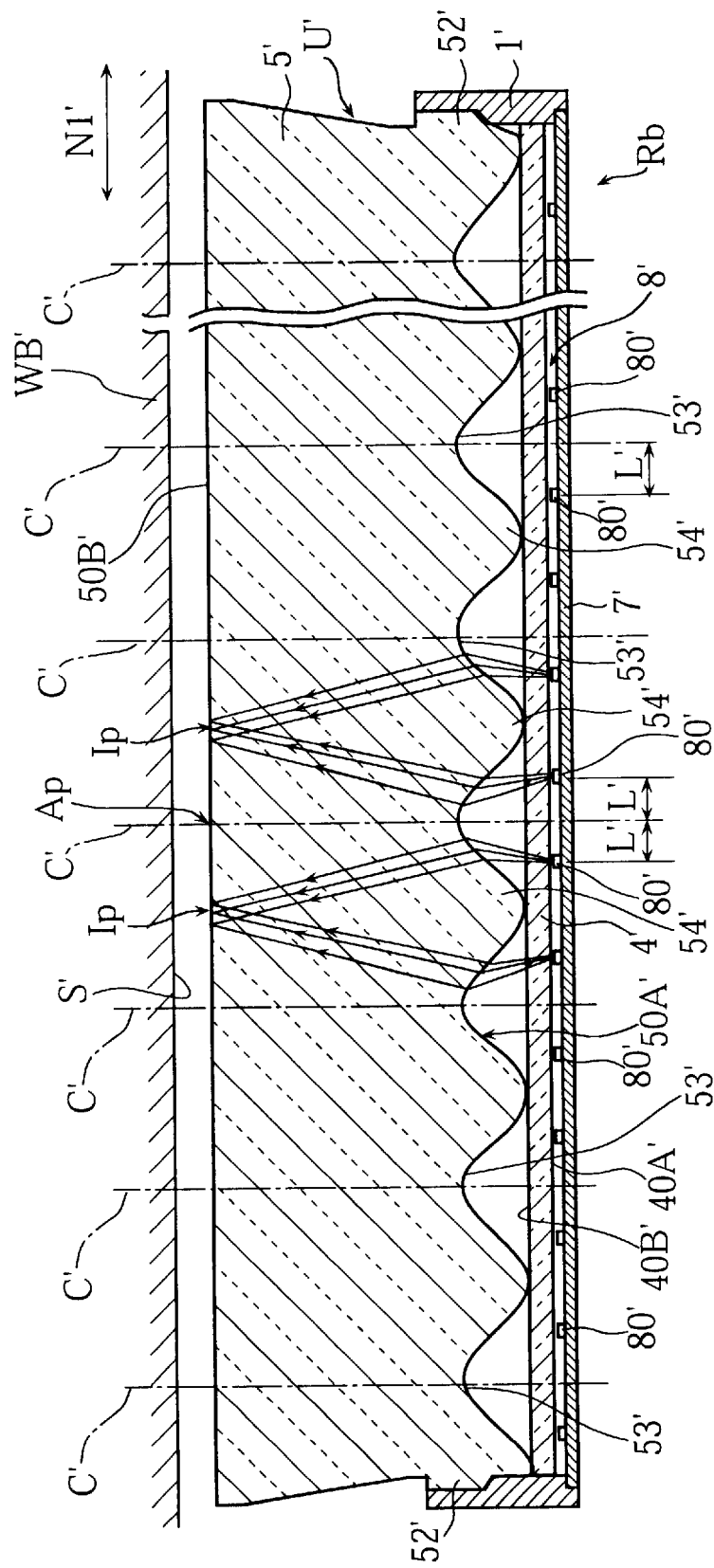
FIG. 9 is a sectional view taken along lines X3—X3 in FIG. 8.

Referring to FIG. 9, the light source 8' includes a plurality of light emitting devices 80' such as: light-emitting diodes (LEDs). The light emitting devices 80', which are mounted on the obverse surface of the substrate 7', are received in the second hollow portion 11' when the substrate 7' is attached to the casing 1' (see also FIG. 8). As shown in FIG. 9, each light emitting device 80' is offset from a corresponding one of the optical axes C' in the primary scanning direction N1'. Preferably, as in the case of the image reading apparatus Ra of the first embodiment, each light emitting device 80' may include a combination of two LEDs of different colors. One of these two LEDs may be designed to emit green light, while the other may be designed to emit red light. With such an arrangement, when only the red LEDs are turned on to emit red light, red portions of the images at the image reading region S' are not read out by the light detectors 8'. On the other hand, when the green LEDs are turned on, all the images at the image reading region S' may be read out by the light detectors 8'. Thus, by comparing the read-out images obtained at one time (when only the red LEDs are turned on) with the other read-out images obtained at another time (when only the green LEDs are turned on), it is possible to distinguish the red portions from the other portions of the images at the image reading region S'. In this manner, a two-color image-reading function can be performed.

Figure 11:
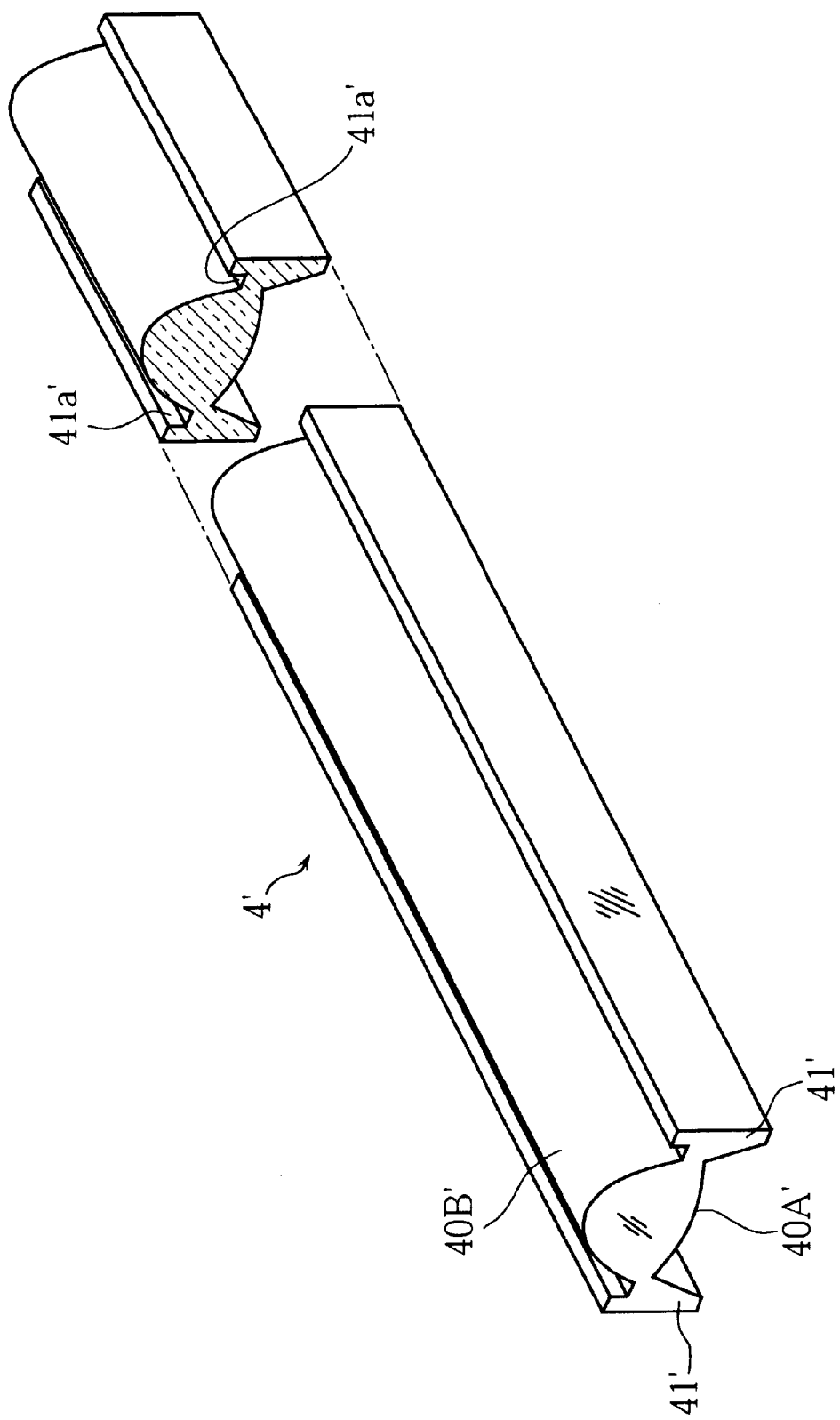
FIG. 11 is a perspective view showing a first transparent member used for the image reading apparatus of the second embodiment.

The first transparent member 4' may be made of poly (methyl methacrylate) (PMMA) or polycarbonate (PC). As shown in FIG. 11, the first transparent member 4' is elongated in one direction and provided with a light receiving surface 40A' and a light emitting surface 40B'. Both of these surfaces 40A', 40B' extend longitudinally of the first transparent member 4'. The light receiving surface 40A' is a smooth, downwardly convex surface, while the light emitting surface 40B' is a smooth, upwardly convex surface. As shown in FIG. 8, the light receiving surface 40A' is wider than the light emitting devices 80'. The curvature of the light emitting surface 40B' is greater than that of the light receiving surface 40A'.

As shown in FIGS. 8 and 11, the first transparent member 4' is provided with two leg portions 41' each of which extends longitudinally of the first transparent member 4'. As best shown in FIG. 8, the leg portions 41' protrude downward beyond the light receiving surface 40A'. When the first transparent member 4' is fitted into the second hollow portion 11' of the casing 1', the two leg portions 41' come into contact with the obverse surface of the substrate 7'. The light receiving surface 40A' of the first transparent member 4' is held in facing relation to the light emitting devices 80'.

As shown in FIGS. 8 and 9, the second transparent member 5' is elongated in the primary scanning direction N1' and has a generally plate-like configuration. The second transparent member 5' may be made of PMMA or PC. The second transparent member 5' is provided with four smooth surfaces: a first surface 50A', a second surface 50B', a third surface 50C' and a fourth surface 50D'. As shown in FIG. 8, the first surface 50A' serves as a light receiving surface, while the second surface 50B' serves as a light emitting surface. The third and the fourth surfaces 50C', 50D' are designed to totally inwardly reflect light propagating through the second transparent member 5', so that the light is properly led from the first surface 50A' to the second surface 50B'.

Referring to FIGS. 8 and 12A, the second transparent member 5' is provided with a predetermined number of leg portions 51' (51'a–51'd). The leg portions 51' are disposed adjacent to the first surface await protrude downward beyond the first surface 50A'. As shown in FIG. 12A, the leg portions 51' are spaced from each other in the primary scanning direction N1'. The first and the third leg portions 51'a, 51'c are provided on the side of the third surface 50C', while the second and the fourth leg portions 51'b, 51'd are provided on the side of the fourth surface 50D'.

Differing from the illustrated arrangement, the first and the second leg portions 51'a, 51'b may not be offset from each other in the primary scanning direction N1' but overlap. Likewise, the third and the fourth leg portions 5'c, 51'd may not be offset from each other in the primary scanning direction N1' but overlap.

Instead of the illustrated leg portions 51', the second transparent member 5' may be provided with two leg portions each of which is elongated in the primary scanning direction N1' like the leg portion 41' of the first transparent member 4' (see FIG. 11).

As shown in FIG. 8, the lower portion of the second transparent member 5' is accommodated in the second hollow portion 11' of the casing 1', while the upper portion thereof protrudes from the casing 1 toward the white board WB'. The second transparent member 5' is directly mounted on the first transparent member 4'.

As shown in FIG. 8, the tips of the respective leg portions 51' are fitted into positioning grooves 41a' (see also FIG. 11) formed in the first transparent member 4'. The intermediate portion of the second transparent member 5' is held between two positioning edges 11a' of the casing 1'. Further, as shown in FIGS. 12A and 12B, the longitudinal opposite ends of the second transparent member 5' are formed with positioning protrusions 52'. Accordingly, the casing 1' is formed with grooves into which the positioning protrusions 52' are fitted (see FIG. 9). With such an arrangement, the second transparent member 5' is fixed to the casing 1' with high positioning accuracy.

The first or light receiving surface 50A' of the second transparent member 5' faces the light emitting surface 40A' of the first transparent member 4' (see FIG. 8). The light receiving surface 50A' is sinuous, as shown in FIG. 12A. Specifically, the light receiving surface 50A' is made up of a plurality of smoothly curved concaved portions 53' and a plurality of smoothly curved convex portions 54'. The concaved portions 53' and the convex portions 54' are disposed alternately with each other. The concaved portions 53' are arranged at a predetermined pitch P' in the primary scanning direction N1'. The pitch P' is equal to the pitch at which the convex lenses 20' of the lens array 2' are arranged. Thus, in FIG. 9 (i.e. as viewed in the secondary scanning direction), the apexes of the respective concaved portions 53' coincide with the optical axes C' of the convex lenses 20'. Each light emitting device 80' is offset from a corresponding one of the optical axes C' in the primary scanning direction N1' by a predetermined distance L'.

As shown in FIG. 8, the third surface 50C' of the second transparent member 5' is not flat but bent. The fourth surface 50D' is also bent to follow the third surface 50C'. Consequently, the second surface 50B' is properly directed to the image reading region S.

The function of the image reading apparatus Rb will now be described.

Referring to FIG. 8, when the light emitting devices 80' are turned on, the emitted light enters the first transparent member 4' through the light receiving surface 40A'. Then, the light propagates through the first transparent member 4' and exits the transparent member 4' via the light emitting surface 40B'. Since the light receiving surface 40A' and the light emitting surface 40B' are convex, the first transparent member 4' functions as a convex lens for the light. Thus, the first transparent member 4' causes the diverging light beams emitted from the light source to converge into generally parallel light beams.

Figure 13:
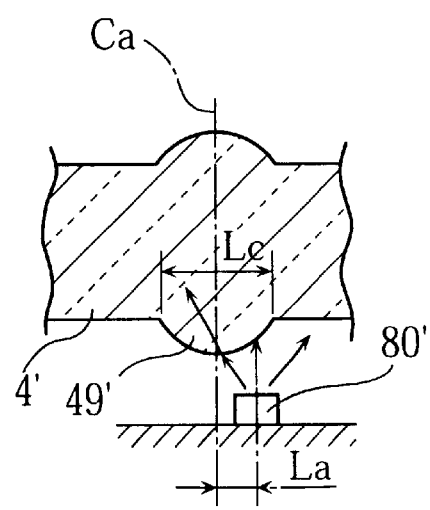
FIG. 13 is a sectional view showing a principal portion of a modified first transparent member.

It should be noted that the light receiving surface 40A' of the first transparent member 4' is much wider than the light emitting devices 80'. The advantage of this arrangement is as follows. Supposing that the downward convex portion 49' of the first transparent member 4' has a small width Lc, as shown in FIG. 13, and that the light emitting device 80, is unduly offset from the optical axis Ca of the convex portion 49', the diverging light beams emitted from the device 80' may fail to be collected into parallel beams even if the deviation La is very small. However, the image reading apparatus Rb of the present invention does not encounter this problem since the light receiving surface 40A' of the first transparent member 4' has a large width. The large width of the light receiving surface 40A' is also advantageous in facilitating the reception of the light emitted from the light source.

Referring back to FIG. 8, after the light exits the first transparent member 4' via the light emitting surface 40B', the light enters the second transparent member 5' via the first surface 50A'. Then, the light propagates through the second transparent member 5' from the first surface 50A' toward the second surface 50B'. In this process, the light may strike the third surface 50C' and/or the fourth surface 50D'. However, the third and the fourth surfaces 50C', 50D' can reflect the light totally inwardly, thereby leading the light to the second surface 50B'. As stated above, the light beams propagating through the second transparent member 5' are parallel to each other. Thus, even when the width Lb of the second transparent member 5' is small, the propagating light will be properly reflected inwardly.

The behavior of the propagating light viewed in the secondary scanning direction N2' is shown in FIG. 9. Originating from the light emitting devices 80', the light passes through the first transparent member 4' as being slightly refracted. Then, the light strikes the first surface 50A' of the second transparent member 5' at various positions at different angles. As viewed in the primary scanning direction N1', each light emitting device 80' is located between the apex of the adjacent convex portion 54' and the adjacent optical axis C'. Thus, as illustrated, most of the light emitted from the light emitting device 80' will enter the second transparent member 5' via the inclined portion of the first surface 50A' which is located between the apex of the adjacent convex portion 54' and the adjacent optical axis C'. Thus, most of the light propagating through the second transparent member 5' is directed away from the adjacent optical axis C'.

Consequently, as shown in FIG. 9, most of the light will converge at intermediate positions Ip between the optical axes C' when it reaches the second surface 50B' of the second transparent member 5'. Though not illustrated in FIG. 9, the light beams emitted from the light emitting devices 80' also meet the portions of the first surface 50A' which are adjacent to the optical axes C'. These light beams are refracted at the first surface 50A' in a diverging manner to propagate through the second transparent member 5' toward the second surface 50B'.

As understood from the above, the brightness at the second surface 50B' of the second transparent member 5' is the lowest at positions Ap adjacent to the optical axes C', but the highest at the intermediate positions Ip between the optical axes C'. The brightness gradually increases from the darkest positions Ap to the brightest positions Ip. Accordingly, the image reading region S' is illuminated with generally the same pattern of brightness. Thus, the image reading apparatus Rb incorporating the second transparent member 5' enjoys the same advantages as the image reading apparatus Ra of the first embodiment.

As described above, the light receiving surface 40A' and the light emitting surface 40B' of the first transparent member 4' are both curved. Alternatively, either one of these surfaces may be flat. Further, preferably the convex light receiving surface 40A' is much wider than the light emitting devices, as described with reference to FIG. 8. According to the present invention, however, the light receiving surface of the first transparent member may be formed with a partial convex portion, as shown in FIG. 13.

Figure 14:
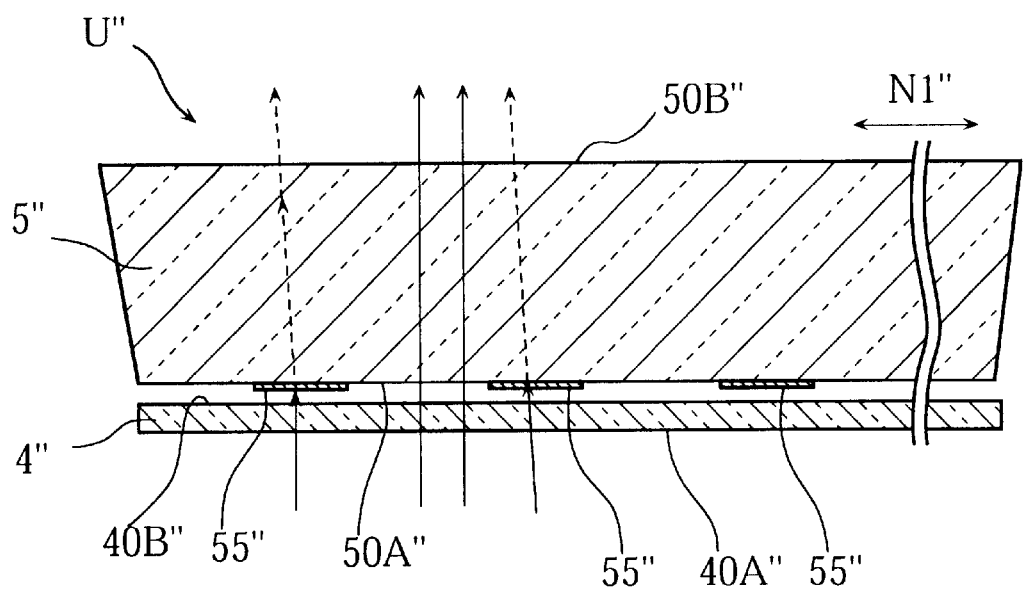
FIG. 14 is a sectional view showing a modified light conducting assembly.
Figure 15:
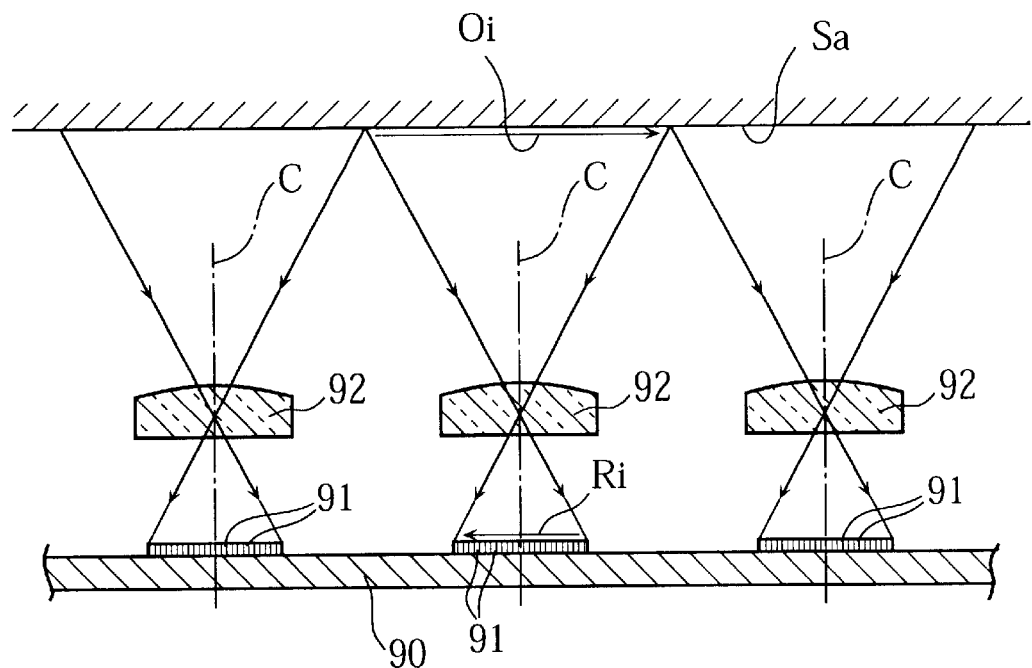
FIG. 15 is a sectional view showing a principal portion of a conventional image reading apparatus.
Figure 16:
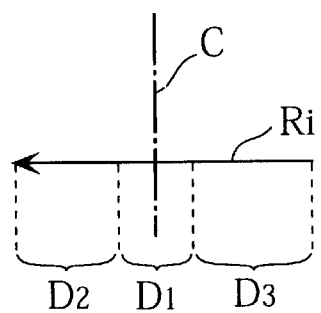
FIG. 16 is a diagram for illustrating the function of a convex lens used for the conventional apparatus.

FIG. 14 shows a modified light conducting unit U" including a first transparent member 4" and a second transparent member 5". The illustrated second transparent member 5" is provided with a flat first surface 50A" and a flat second surface 50B". The first surface 50A" is partially shielded by light shielding members 55" arranged between the first and the second transparent members 4", 5". In the illustrated example, the light shielding members 55" are attached to the second transparent member 5". Alternatively, they may be attached to the first transparent member 4".

The light shielding members 55" are spaced from each other in the primary scanning direction N1". Each shielding member 55" may be made of a material having low transparency, so that the shielding member 55" is completely opaque or semi-transparent (translucent). With such an arrangement, the same advantages can be enjoyed as in the case of the light conducting unit U' described above.

The present invention being thus described, it is obvious that the same may be varied in many ways. For instance, a part of the first or second transparent member may be semi-transparent or opaque. A light shielding member may be attached to a surface other than the light receiving surface and the light emitting surface of the first or second transparent member. Further, a third transparent member may be used together with the first and the second transparent members to constitute a light conducting unit. Such variations are not to be regarded as a departure from the spirit and scope of the present invention, and all such modifications as would be obvious to those skilled in the art are intended to be included within the scope of the following claims.

What is claimed is:

1. An image reading apparatus comprising:

a light source arranged to emit light for illuminating a linear image reading region extending in a primary scanning direction;

a plurality of lenses arranged in an array for focusing light reflected on the image reading region and for producing reduced images, each of the lenses having an optical axis which intersects a predetermined portion of the image reading region;

a plurality of light receiving elements for output of image signals based on the light focused by the lenses; and a light conductor for leading the light emitted by the light source toward the image reading region;

wherein the light conductor leads the emitted light so that said predetermined portion is illuminated more brightly than other portions of the image reading region which are adjacent to said predetermined portion; and wherein the light conductor includes a transparent member having a first surface and a second surface, the first surface facing the light source, the second surface facing the image reading region, the transparent member being arranged to lead light from the first surface to the second surface so that distribution of light at the first surface is different from distribution of light at the second surface.

2. The apparatus according to claim 1, wherein the transparent member is formed with a plurality of indents facing the image reading region, each of the indents being provided with an inclined portion slanted relative to the first surface of the transparent member.

3. The apparatus according to claim 2, wherein the transparent member is formed with a plurality of projections facing the image reading region, each of the projections having a corner at which a cutout is provided.

4. The apparatus according to claim 2, wherein the light source includes a plurality of light-emitting diodes arranged in an array, the light-emitting diodes being offset in the primary scanning direction from the optical axes of the respective lenses.

5. The apparatus according to claim 4, wherein each of the light-emitting diodes is held in facing relation to a relevant one of the inclined portions of the indents.

6. The apparatus according to claim 1, further comprising a casing for supporting the light source, the lenses, the light receiving elements and the light conductor, the light conductor protruding partially from the casing toward the image reading region.

7. The apparatus according to claim 1, wherein the first surface of the transparent member is formed with a convex portion facing the light source.

8. The apparatus according to claim 1, wherein the light conductor includes a first transparent member and a second transparent member.

9. The apparatus according to claim 8, wherein the first transparent member is provided with a light receiving surface facing the light source and a light emitting surface opposite to the light receiving surface, at least either one of the light receiving surface and the light emitting surface being provided with a convex portion extending in the primary scanning direction.

10. The apparatus according to claim 9, wherein the second transparent member is formed separately from the first transparent member and arranged to lead light emitted from the light emitting surface toward the image reading region.

11. The apparatus according to claim 9, wherein both the light receiving surface and the light emitting surface of the first transparent member are convex.

12. The apparatus according to claim 9, wherein the second transparent member is provided with a light receiving surface held in facing relation to the light emitting surface of the first transparent member.

13. The apparatus according to claim 12, wherein the light receiving surface of the second transparent member is sinuous.

14. The apparatus according to claim 12, further comprising light shielding members arranged between the light emitting surface of the first transparent member and the light receiving surface of the second transparent member.

15. The apparatus according to claim 8, wherein the light source includes a plurality of light-emitting diodes arranged in an array, the light-emitting diodes being offset in the primary scanning direction from the optical axes of the respective lenses.

16. The apparatus according to claim 8, wherein the first and the second transparent members are fixed to each other.

17. The apparatus according to claim 16, wherein the first transparent member is formed with a positioning groove, the second transparent member being formed with a leg portion fitted into the positioning groove of the first transparent member.

* * * * *